(12) United States Patent
Lebeane et al.

(10) Patent No.: US 10,684,957 B2
(45) Date of Patent: Jun. 16, 2020

(54) APPARATUS AND METHOD FOR NEIGHBORHOOD-AWARE VIRTUAL TO PHYSICAL ADDRESS TRANSLATIONS

(71) Applicant: Advanced Micro Devices, Inc., Santa Clara, CA (US)

(72) Inventors: Michael W. Lebeane, Austin, TX (US); Seunghee Shin, Raleigh, NC (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/110,062

(22) Filed: Aug. 23, 2018

(65) Prior Publication Data

US 2020/0065255 A1 Feb. 27, 2020

(51) Int. Cl.
*G06F 12/00* (2006.01)
*G06F 12/10* (2016.01)

(52) U.S. Cl.
CPC .......... *G06F 12/10* (2013.01); *G06F 2212/65* (2013.01); *G06F 2212/68* (2013.01)

(58) Field of Classification Search
None
See application file for complete search history.

(56) References Cited

U.S. PATENT DOCUMENTS

| | | | | |
|---|---|---|---|---|
| 8,516,221 B2 * | 8/2013 | Thelen | ............... | G06F 12/1027 711/207 |
| 8,601,223 B1 * | 12/2013 | Yuan | ................... | G06F 12/1027 345/535 |
| 9,086,988 B2 * | 7/2015 | Bybell | ............... | G06F 12/1027 |
| 10,191,853 B2 * | 1/2019 | Raja | .................... | G06F 12/1009 |
| 2004/0215918 A1 * | 10/2004 | Jacobs | ............... | G06F 12/1009 711/207 |
| 2019/0188149 A1 * | 6/2019 | Abhishek Raja | ... | G06F 12/1036 |

OTHER PUBLICATIONS

Vesely, Jan et al.; Observations and Opportunities in Architecting Shared Virtual Memory for Heterogeneous Systems; ISPASS 2016.
Pichai, Bharath et al.; Architectural Support for Address Translation on GPUs: Designing Memory Management Units or CPU/GPUs with Unified Address Spaces; ASPLOS Mar. 2014.

* cited by examiner

*Primary Examiner* — John A Lane
(74) *Attorney, Agent, or Firm* — Faegre Drinker Biddle & Reath LLP (57) ABSTRACT

An apparatus and method performs neighborhood-aware virtual to physical address translations. A coalescing opportunity for a first virtual address is determined, based on completing a memory access corresponding to a page walk for a second virtual address. Metadata corresponding to the first virtual address is provided to a page table walk buffer based on the coalescing opportunity and a page walk for the first virtual address is performed based on the metadata corresponding to the first virtual address.

28 Claims, 8 Drawing Sheets

APPARATUS AND METHOD FOR NEIGHBORHOOD-AWARE VIRTUAL TO PHYSICAL ADDRESS TRANSLATIONS

GOVERNMENT LICENSE RIGHTS

This invention was made with Government support under PathForward Project with Lawrence Livermore National Security (Prime Contract No. DE-AC52-07NA27344, Subcontract No. B620717) awarded by the Department of Energy (DOE). The Government has certain rights in this invention.

BACKGROUND OF THE DISCLOSURE

Graphics processing units (GPUs) have emerged as a first-class computing platform. The massive data parallelism of GPUs was first leveraged by highly-structured parallel tasks such as matrix multiplications. However, GPUs have more recently found use across a broader range of application domains such as deep learning, graph analytics, data analytics, computer-aided-design, oil and gas exploration, medical imaging, and computational finance. Memory accesses from many of these emerging applications demonstrate a larger degree of irregularity—accesses are less structured, and are often data dependent. Consequently, they show low spatial locality (e.g., if a memory location is accessed at a particular time, then it is unlikely that the memory location and/or nearby memory locations will be accessed in the near future).

It has been demonstrated that that such irregular memory accesses may slow down an irregular GPU application by up to 3.7-4 times due to address translation overheads alone. Further, the negative impact of access irregularity may be greater on the address translation than on the data access itself. For example, compared to one memory access on a cache miss, a miss in the translation lookaside buffer (TLB) triggers a page table walk that may take up to four sequential memory accesses in the prevalent x86-64 or ARM computer architectures.

Typically, a hardware page table walker (PTW) walks (accesses) the in-memory page table to find the desired translation. To match a GPU's need for large memory bandwidth, hardware designers often provision multiple independent PTWs. However, TLB misses from irregular GPU applications, and their corresponding page table walk requests, often happen in bursts. Consequently, they add significant queuing delay in the critical path of execution. A cache access cannot begin until the corresponding address translation completes, since modern GPUs tend to employ physically-tagged caches.

Figure 1:
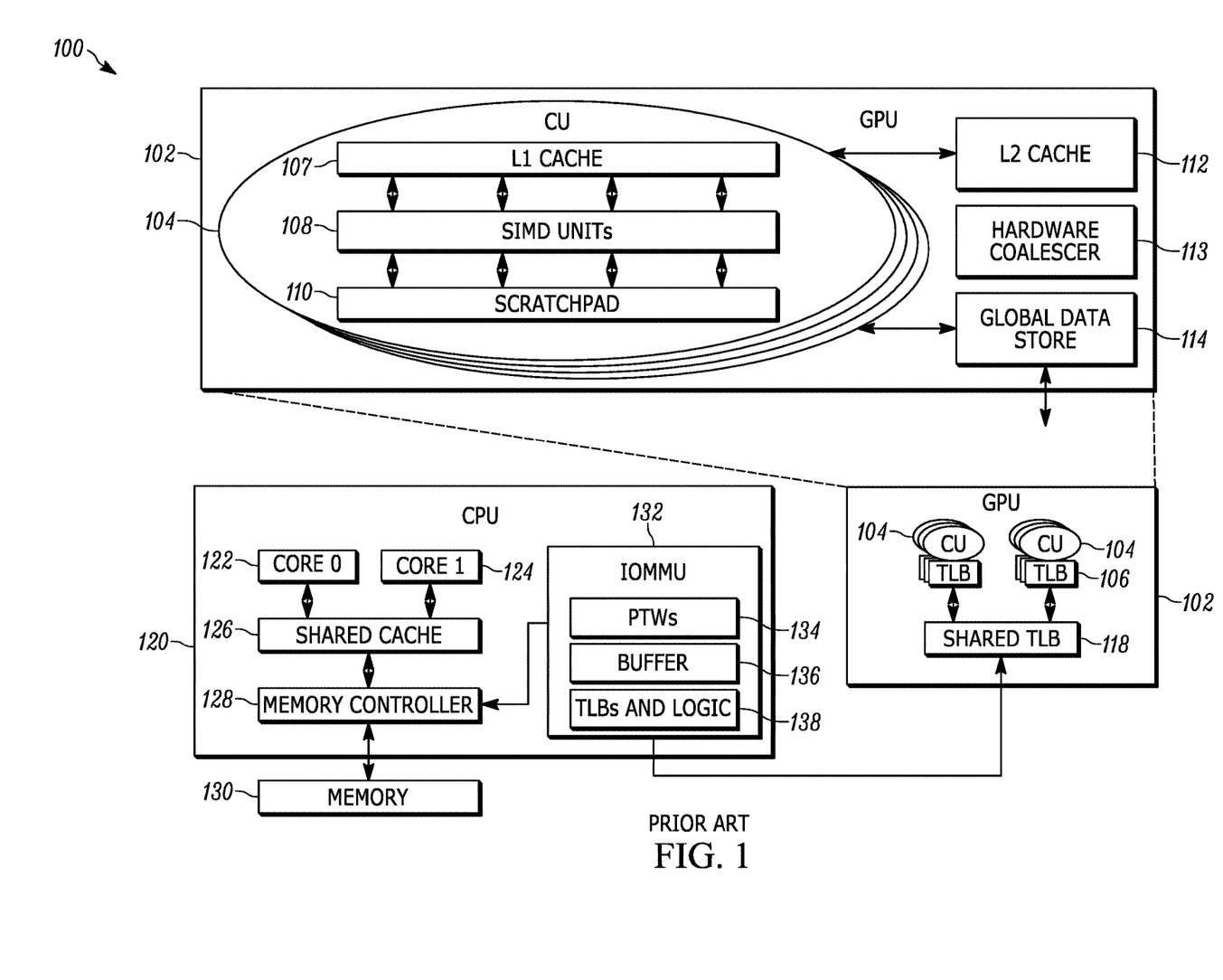
FIG. 1 is a schematic block diagram illustrating an example of an apparatus with a traditional system architecture.

FIG. 1 is a schematic block diagram illustrating an example of a traditional apparatus that includes a traditional system architecture 100. The traditional system architecture 100 includes a GPU 102, a central processing unit (CPU) 120, an input output memory management unit (IOMMU) 132, and device or system memory 130. GPUs, such GPU 120, are designed for massive data-parallel processing that operates on hundreds to thousands of data elements concurrently. The hardware resources of GPU 120 are typically organized in a hierarchy to effectively manage the massive concurrency.

The top part of FIG. 1 depicts the architecture of a typical GPU 102. Compute Units (CUs) 104 are the basic computational blocks of the GPU 102, and there are typically 8 to 64 CUs 104 in a GPU 102. Each CU 104 includes multiple Single-Instruction-Multiple-Data (SIMD) units 108, each SIMD unit 108 has multiple (e.g., 16) lanes of execution. GPU 102 threads are scheduled to SIMD units in a bundle called a wavefront (or warp), which is typically composed of 32 or 64 threads. These wavefronts execute the same instruction with different data on a SIMD unit. A Single-Instruction-Multiple-Thread (SIMT) unit 108 is mapped to the SIMD units by using execution masks in the case where GPU 102 threads in the same wavefront follow different execution paths.

The memory resources of the GPU 102 are also arranged in a hierarchy. For example, each CU 104 has a private L1 data cache 107 and a scratchpad 110 that are shared across the SIMD units 108 within the CU 104. When several data elements accessed by a SIMD instruction reside in the same cache line, a hardware coalescer 113 in the GPU 102 combines these requests into a single cache access to gain efficiency. Further, a large L2 cache 112 is shared across all CUs 104 in a GPU 102. Also, a global data store 114 is scratchpad memory for the GPU 102, and is used by GPU applications to improve performance.

General-purpose GPU (GPGPU) programming languages, such as OpenCL and CUDA, expose to the programmer a hierarchy of execution groups that map directly to hardware resources. A work-item or thread executes on a SIMD lane while 32 to 64 work-items execute in a lock-step fashion on a SIMD unit 108 of a CU 104. Several such wavefronts form a work-group that executes on a single CU 104. Work-items in a work-group can efficiently synchronize and share data through the on-chip scratchpad memory 110. Additionally, multiple work-groups make up a GPU 102 program or kernel.

GPUs 102 have adopted several key programmability-enhancing features as they mature to become first-class computational units. One such feature is a shared virtual memory (SVM) across the CPU 120 and the GPU 102. For example, full compliance with industry promoted standards like the Heterogeneous System Architecture (HSA) requires GPUs 102 to support SVM. To enable shared virtual memory in modern commercial GPUs 102, a shared page table between CPU 120 and GPU 102 via the IO Memory Management Unit (IOMMU) hardware 132 may be used.

The bottom part of FIG. 1 depicts the key hardware components and/or entities of the SVM in a traditional system architecture 100. Conceptually the key enabler for SVM is the GPU's 102 ability to walk the same page table (e.g., the x86-64 page table) as the CPU 120 via the IOMMU 132. By sharing the same page table, a process running on a GPU 102 may observe the same virtual-to-physical address mapping as a process running on a CPU 120 and consequently, share the same virtual memory.

Figure 2:
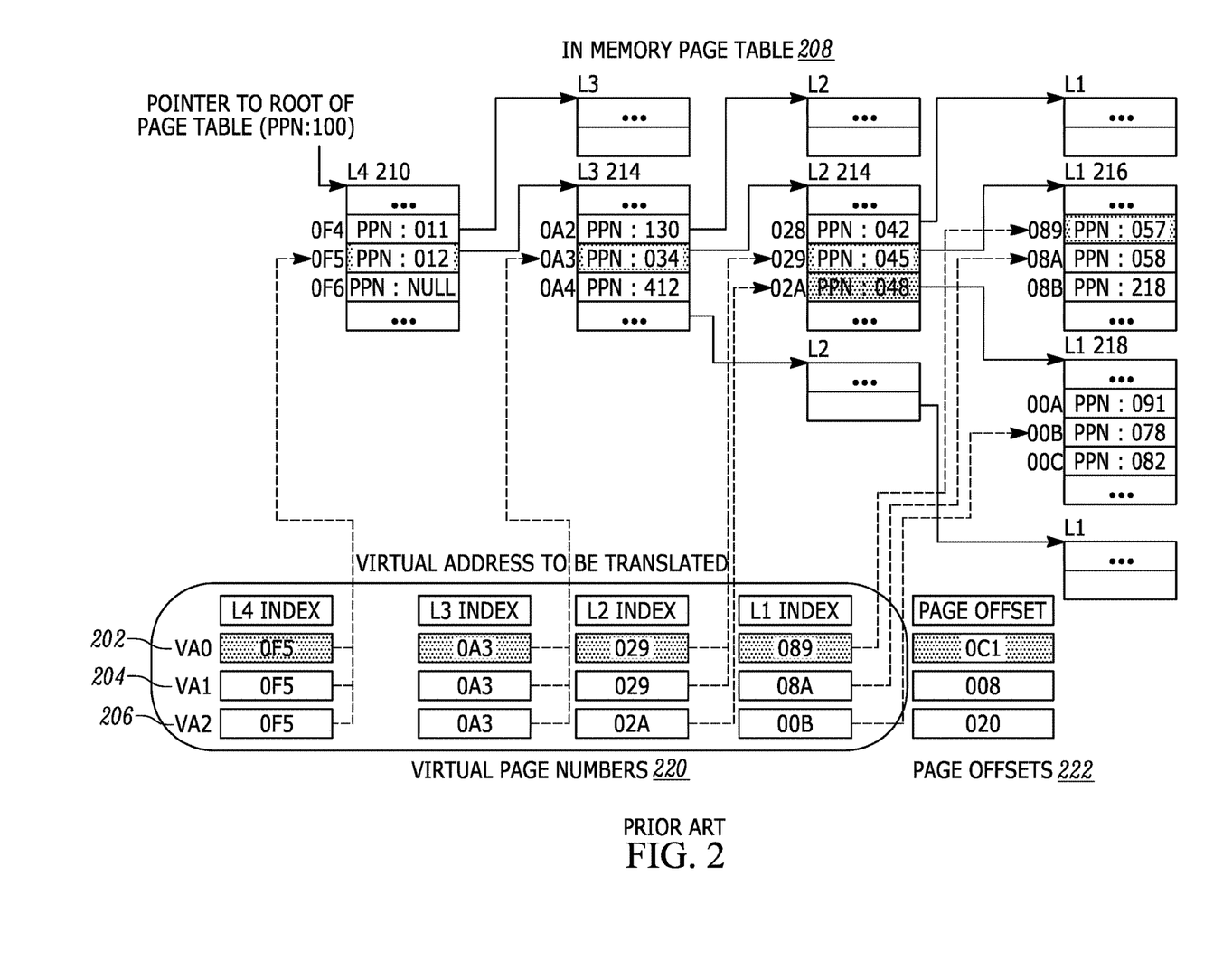
FIG. 2 is an exemplary representation of a traditional in-memory page table and virtual addresses.

In other words, by sharing the same virtual memory, virtual memory addresses that are misses in the GPU's 102 TLBs 106 may be mapped to physical memory addresses using the IOMMU 132 of the CPU 120. FIG. 2 illustrates an example of an in-memory page table 208 and virtual addresses 202, 204, and 206. In particular, FIG. 2 will be used to describe how a hardware page table walker 134 in an IOMMU 132 translates three example virtual addresses 202, 204, 206 by walking an in-memory page table 208. For example, if the system architecture 100 is an x86-64-based implementation, a processor's page table is structured as a 512-ary radix tree with four levels, and thus, requires four memory accesses to complete a page walk. The virtual memory addresses 202, 204, 206 are first broken into virtual page numbers 220 and a physical page offset 222. By walking the page table 208, the virtual page numbers 220 are translated to physical page frame numbers (PPN), which is eventually concatenated with the page offset 222 to generate the final physical address.

In one example, a page walk starts by looking up the 4 KB page containing the root node 210 of a page table (also called level L4 nodes). The root node 210 has 512 pointers to nodes at the next level of the tree (referred to as the L3 nodes). The top nine bits of a 48-bit wide virtual address 202, 204, 206 (bits 47 to 39), known as the L4 index, are used to index into the root node 210 to find the pointer to the appropriate L3 node (e.g., L3 node 212). An L3 node, such as L3 node 212, also contains 512 pointers to nodes in the next level (referred to as the L2 level nodes). The next nine bits of the VA 202, 204, 206 (bits 38-30), known as the L3 index, are used to index into the L3 node 212 to reach an appropriate node in the L2 level (e.g., L2 node 214). Similarly, bits 29 to 21, known as the L2 index, are used to index into the L2 node 214 to reach a node in the leaf level (referred to as the L1 level). An L1 node (e.g., L1 nodes 216, 218) contains 512 physical page frame numbers, each corresponding to a 4 KB virtual address page. Bits 20 to 12 of the VA, known as the L1 index, are used to index into the L1 nodes 216, 218 to find the desired physical page frame number. Herein, levels L4 to L2 are referred to as upper levels of the page table 208.

In some examples, the first two virtual addresses (VA0 202 and VA1 204) share the same entries for all upper levels of the page table (e.g., L4 node 210, L3 node 212, and L2 node 214). Similarly, the third virtual address (VA2 206) shares entries in first two upper level (e.g., L4 node 210 and L3 node 212) of the page table 208. Traditional hardware page walk caches (PWCs) may exploit this redundancy. For example, traditional PWCs (not displayed in FIG. 1) are located within the IOMMU 132 and store recently-used page table entries from the upper-levels of a page table. Hits in PWCs reduce the number of memory accesses needed for a walk by up to three memory accesses depending upon which upper level (L4, L3 or L2) produces the hit. For example, a hit for the entire upper level (L4, L3 and L2) will need just one memory request to complete the walk by accessing only the leaf node (L1). In contrast, a hit for only the root level requires three memory accesses. In the worst case, a complete miss in the PWCs requires four memory accesses to complete a page walk.

An IOMMU 132 typically houses multiple independent page table walkers 134 (e.g., 8-16) to concurrently service several page table walk requests. Multiple walkers 134 are important since GPUs 102 demand high memory bandwidth and, consequently, often send many concurrent walk requests. The IOMMU 132 itself has two levels of TLBs and logic 138 to cache recently used address translations, but they are relatively small and designed to primarily serve devices that do not have their own TLBs (e.g., a Network Interface Controller). Page walk requests typically queue up in IOMMU's page walk request buffer 136 (e.g., IOMMU buffer) before beginning the walk. When a walker 134 becomes free (e.g., after it finishes servicing a walk), it starts servicing a new request from the IOMMU buffer 136 in the order it arrived.

GPUs 102 typically have a sophisticated TLB hierarchy 106, 118 to reduce the number of page walks. A TLB, such as a TLB from the hierarchy 106, 118, caches recently-used address translation entries to avoid accessing in-memory page tables on every memory access. When multiple data elements accessed by a SIMD instruction reside on the same page, only a single virtual-to-physical address translation is needed. The hardware coalescer 113 exploits this locality to look up the TLB hierarchy 106, 118 only once for such same-page accesses. Each CU has a private L1 TLB 106. Misses in an L1 TLB 106 looks up a larger L2 TLB 118 that is shared across all the CUs in the GPU 102. A translation request that misses in both levels 106, 118 is forwarded to the IOMMU 132.

In some variations, an address translation request is generated when executing a SIMD memory instruction (load/store). The hardware coalescer 113 merges multiple requests to the same page (e.g., 4 KB) generated by the same SIMD memory instruction. The hardware coalescer 113 looks up the virtual address translation request in the GPU's L1 TLB 106 and then the GPU's shared L2 118 (if it misses in the L1 TLBs 106). On a miss in the GPU's L2 TLB 118, the GPU 102 sends the request to the IOMMU 132. The IOMMU 132 first looks up the request in the IOMMU's TLBs and logic 138.

On a miss in the IOMMU's TLBs 138, the IOMMU 132 queues up the request as a page walk request in the IOMMU buffer 136. When an IOMMU's page table walker 134 becomes free, it selects a pending request from the IOMMU buffer 136 in first-come-first-serve order. The page table walker 134 first performs a lookup in the PWC, and then completes the walk of the page table, generating one to four memory accesses. On finishing a walk, the desired translation is returned to the IOMMU 132, the GPU TLBs 106, 118, and the CUs 104.

CPUs, such as the traditional CPU 120, include one or more cores (e.g., core 0 122 and core 1 124) for executing instructions and/or providing address translations between virtual and physical memory addresses. In some examples, the cores 122 and 124 include one or more TLBs, one or more PTWs, and a private cache (L1). The cores 122 and 124 may share a shared cache (e.g., L2 and/or L3 cache) 126. The functionalities of the components and/or entities of the CPU 120 (e.g., TLBs, PTWs, L1 and L2 caches, and the cores 122 and 124) are similar to the functionalities of the corresponding components in the GPU 102 described above. Further, the CPU 120 includes a memory controller 128 that is connected to the IOMMU 132 and memory 130. Memory 130 is system memory. The memory controller 128 performs memory accesses for the cores 122, 124, and/or the IOMMU 132. For example, the memory controller 128 accesses the memory 130 and/or the shared cache 126 based on requests from the IOMMU 132.

As explained above, irregular memory accesses cause memory access divergence in the GPU's execution model for translating between virtual and physical addresses. For example, although different work-items within a wavefront execute the same instruction, they access data from distinct page entries. This renders the hardware coalescer 113 ineffective, and consequently, many concurrent TLB accesses are generated by execution of a single SIMD load/store instruction. Furthermore, many of these requests often miss in the TLB owing to low access locality of irregular applications (e.g., subsequent requests are unlikely to access the same memory location as a previous request in the near future). Eventually, these address translation requests queue up in the IOMMU buffer 136 to be serviced by the page table walkers 134. The significant queuing latency at the PTWs 134 ultimately slows down applications. Further, due to the many distinct page entries, the PWCs are also rendered less effective. Additionally, with caching (e.g., using PWCs), even if the required PTE is available in the newly added IOMMU 132 PWCs, a separate PTW 134 still needs perform that walk. Often the unavailability of free PTWs 134 leads to significant queuing delay in servicing walk requests.

Furthermore, besides the performance implications, a PWC for PTEs needs to be kept coherent since the latest PTEs can even be in the CPU L1 cache 126. Extending coherence to a non-core component, like the IOMMU 132, incurs significant design and energy overheads. Accordingly, there exists a need for one or more improved methods and devices to address one or more of the above-noted drawbacks.

BRIEF DESCRIPTION OF THE DRAWINGS

The embodiments will be more readily understood in view of the following description when accompanied by the below figures and wherein like reference numerals represent like elements, wherein.

DETAILED DESCRIPTION OF EMBODIMENTS

Briefly, in some examples, an apparatus and method provides neighborhood-aware (NA) virtual to physical memory address translations. For example, the method and apparatus aims to reduce overhead and/or cost of the address translations between virtual memory addresses to physical memory addresses for irregular and/or regular GPU applications. For example, many concurrent page table walk requests include address translation for virtual pages belonging to the same neighborhood. A set of page walk requests are concurrent if the page walk requests are either pending or being serviced during the same or overlapping period of execution. A set of virtual page addresses are part of the same neighborhood if their address mappings (e.g., corresponding page table entries or PTEs) are included in the same cache line. For instance, each PTE in an x86-64 system is 8-bytes long. Therefore, a typical 64-byte long cache line includes PTEs of eight neighboring virtual page addresses.

Like many other memory accesses, a traditional PTW accesses memory at the granularity of a cache line (e.g., 64 bytes) while walking the in-memory page table. However, the traditional PTW makes use of only the 8-byte PTE needed for translating the requested virtual page address. As described in further detail below, the method and apparatus services one or more pending page walk requests for any virtual page addresses in the same neighborhood (e.g., whose PTEs are contained in the same cache line, at the same time of the current request), which makes better use of other PTEs in the same cache line brought in by the PTW. Consequently, the method and apparatus saves later memory accesses to the same cache line that would have otherwise happened when those page walk requests for virtual pages on the same neighborhood are serviced. Ultimately, the reduction in the number of memory accesses to the in-memory page table speeds up applications (e.g., irregular GPU applications) by reducing page walk latency.

In some examples, an apparatus and method determines a coalescing opportunity for a first virtual address based on completing a memory access corresponding to a page walk for a second virtual address. The method and apparatus provides, in a page table walk buffer, metadata for the first virtual address based on the coalescing opportunity. In one example the metadata for the first virtual address includes a physical address field and a page level field. The method and apparatus performs a page walk for the first virtual address based on the metadata for the first virtual address.

In some examples, the method and apparatus retrieves, from the memory storing a page table (e.g., cache memory and/or device memory), multiple page table entries including a page table entry for the second virtual address and multiple neighborhood page table entries. The multiple neighborhood page table entries are page table entries that are in a same cache line as the page table entry for the second virtual address. The method and apparatus determines that the multiple neighborhood page table entries include a page table entry for the first virtual address. In some implementations, the method and apparatus provides, to the page table walk buffer, a physical address field for the first virtual address and a page level field for the first virtual address based on the page table entry for the first virtual address. In some examples, the method and apparatus provides, to the page table walk buffer, a coalescing logic field for the first virtual address. The coalescing logic field indicates that the first virtual address is being coalesced with the page walk for the second virtual address.

The method and apparatus performs the page walk for the first virtual address using the physical address field corresponding to the first virtual address and the page level field for the first virtual address to reduce at least one memory access for the page walk of the first virtual address. In some examples, the method and apparatus initiates the page walk for the first virtual address at a page level indicated by the page level field. The method and apparatus accesses a physical memory location indicated by the physical address field.

In some variations, in response to determining that the page level for the first virtual address indicates a leaf node, the method and apparatus provides, to a requestor (e.g., an irregular GPU application) and without performing a memory access for the first virtual address, a physical frame number indicated by the physical address field for the first virtual address. The physical frame number corresponds to a translated physical address for the first virtual address. In some examples, the metadata for the first virtual address includes a coalescing logic field indicating that the first virtual address is being coalesced with the page walk for the second virtual address. The method and apparatus delays performing the page walk for the first virtual address based on the coalescing logic field.

In some examples, the processor includes a page table walk service table. The method and apparatus retrieves, from the page table walk service table, an entry for the second virtual address. The method and apparatus determines neighborhood virtual addresses of the second virtual address based on the entry for the second virtual address. The neighborhood virtual addresses are virtual addresses adjacent to the second virtual address (e.g., the neighborhood virtual addresses are addresses with page table entries in the same cache line as the second virtual address). The method and apparatus determines the coalescing opportunity based on the neighborhood virtual addresses.

In some variations, a CPU includes a neighborhood-aware input-output memory management unit (NA IOMMU). The NA IOMMU includes the page table walk buffer with metadata and the neighborhood-aware page table walker logic. The neighborhood-aware page table walker logic performs neighborhood-aware virtual to physical address translations. In some examples, the method and apparatus obtains the first virtual address and the second virtual address from a graphics processing unit (GPU). In some variations, a GPU includes the page table walk buffer with metadata and the neighborhood-aware page table walker logic. The neighborhood-aware page table walker logic performs neighborhood-aware virtual to physical address translations.

Figure 3:
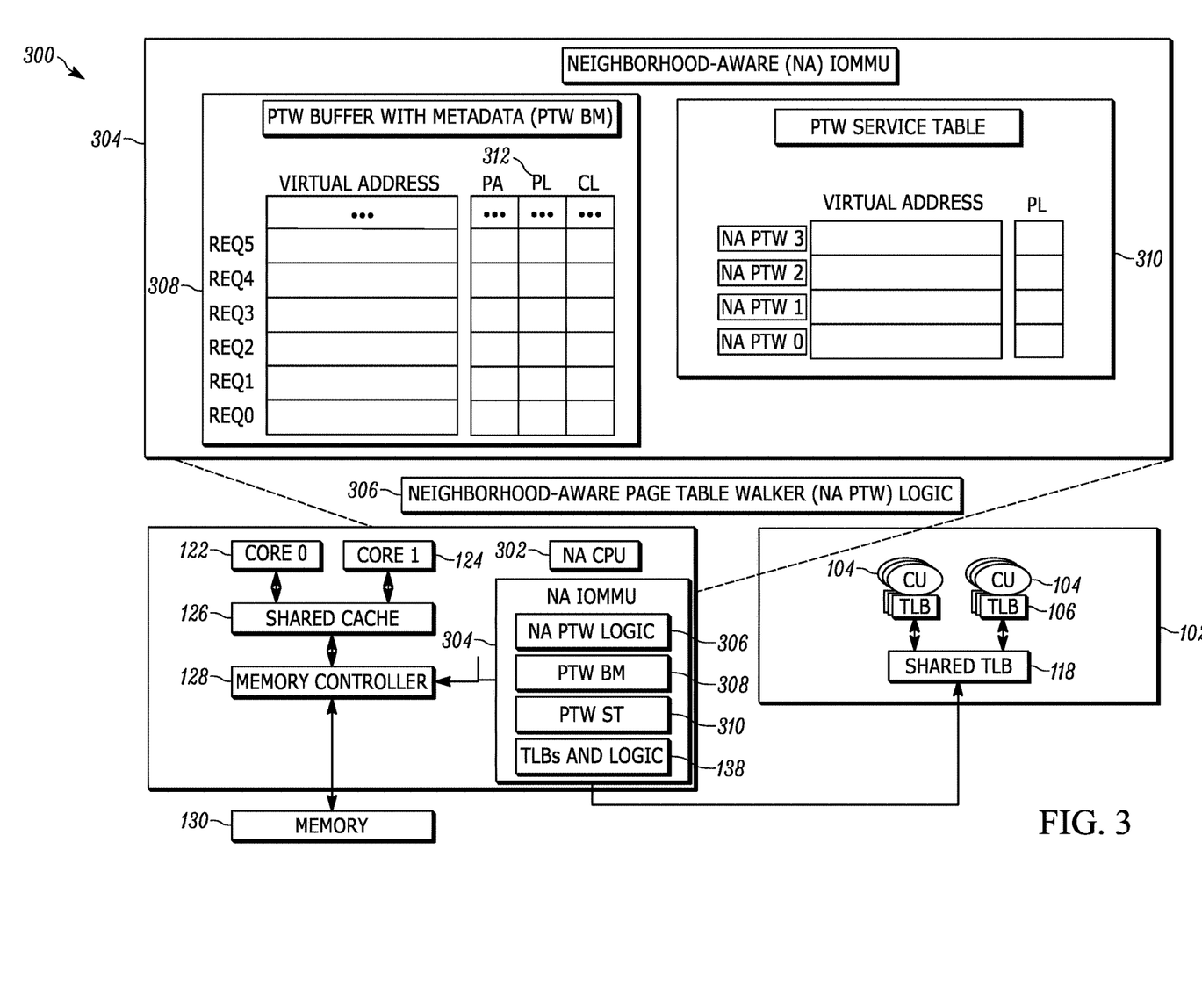
FIG. 3 is a schematic block diagram illustrating an example of a neighborhood-aware (NA) apparatus for performing neighborhood aware virtual to physical address translations in accordance with one embodiment set forth in the disclosure.

FIG. 3 is a schematic block diagram illustrating an example of a neighborhood-aware (NA) apparatus 300 (e.g., a computing device) that employs a NA input-output memory management unit 304. Examples of the NA apparatus 300 include but are not limited to workstations, servers, cloud computing platforms, laptops, desktops, tablet computers, hand-held devices, game consoles, wearables, displays, printers, integrated circuits and the like. In some examples, such as the examples described below, the NA apparatus 300 is operating a x86-64 system architecture. The illustrative NA apparatus 300 is not intended to suggest any limitation as to the scope of use or functionality of embodiments of the present disclosure. Neither should the illustrative NA apparatus 300 be interpreted as having any dependency or requirement related to any single component or combination of components illustrated therein. Additionally, various components depicted in FIG. 3, in embodiments, may be integrated with various ones of the other components depicted therein (and/or components not illustrated). For example, the NA apparatus 300 operates other system architectures, such as an ARM architecture and/or any other suitable system architectures, can include one or more hardware features and/or functionalities to perform neighborhood aware virtual to physical address translations described below.

The NA apparatus 300 includes many components and/or entities similar to the apparatus 100. For example, the NA apparatus 300 includes a traditional GPU 102, one or more cores (e.g., core 122, 124), a shared cache 126, and/or a memory controller 128. Also, the NA IOMMU's TLBs and logic 138 is similar between apparatus 100 and 300, and is described above.

However, other components of the NA IOMMU 304 are different from the components of the IOMMU 132. For example, while the page table walk buffer with metadata 308 (PTW BM) includes the pending requested address translations (e.g., the virtual addresses indicated by the TLB misses 406, as described in connection with FIG. 4) similar to the IOMMU buffer 136, the PTW BM 308 also includes metadata 312. The metadata 312 indicates one or more new fields (e.g., physical address (PA) field, page level (PL) field, coalescing (CL) field). Each request or virtual address has corresponding metadata 312. In some examples, the PTW BM 308 includes the PL field, which indicates the level of the page table up to which the given walk request has coalesced with another page table access. The value of this field depends on the page table hierarchy. For example, in an x-86 page table with 4 levels, the PL field can be L4, L3, L2, L1, or NULL. In some variations, the PTW BM 308 includes a PA field, which indicates the physical address of the page table node in the next level (identified by the value in field PL) of the walk. This field is populated when the given page walk request gets coalesced for upper-level access to the page table. Both these fields are NULL if a given walk request is not being coalesced with a page walk for another request. In some instances, the metadata 312 includes the CL field, which indicates if the corresponding walk request is being considered for coalescing with an on-going access to the page table. The CL field is used in deciding which page walk request is to be serviced by a free NA PTW.

The page table walk service table (PTW ST) 310 includes an entry for each independent neighborhood-aware page table walker (NA PTW) in the NA PTW logic 306. For example, the NA PTW logic 306 includes multiple NA PTWs (e.g., 8). For the sake of clarity, only 4 NA PTWs are shown in the PTW ST 310. However, the NA PTW logic 306 can include as many NA PTWs as necessary to perform the NA virtual to physical address translations. For each NA PTW, the PTW ST 310 includes a corresponding entry. Each entry indicates the virtual page address of the page walk request currently being serviced by the corresponding walker ("Null" if the NA PTW is free) and the level of the page table (PL) which is currently being accessed. This information is utilized to determine the opportunity for coalescing as will be explained below.

As will be explained in further detail below, the NA PTWs obtain virtual memory addresses, and by accessing memory (e.g., the shared cache 126 and/or memory 130), translates the virtual addresses to physical addresses. For example, the NA PTW obtains (e.g., receives and/or retrieves) a cache line (e.g., a 64-byte cache line) including a requested PTE for the corresponding virtual memory address and neighborhood (e.g., adjacent) PTEs for neighborhood virtual memory addresses. Further, the NA PTW scans the PTW BM 308 for pending (concurrent) page walk requests to addresses in the same neighborhood (e.g., whose PTEs also fall in the just-brought cache line). These page walk requests are then serviced immediately, disregarding the order in which they arrived at the device. Thus, in some variations, this technique coalesces accesses to the in-memory page table for page walk requests outstanding at the same time and for pages in the same neighborhood.

In some instances, for example in a typical hierarchical page table organization (e.g., 4-level for x86), the NA PTW selectively or opportunistically coalesces accesses to upper levels (e.g., L4, L3, L2) of the page table as well as to the leaf level (e.g., L1) of the page table. For instance, an x86-64 page table is structured as a four-level radix tree as shown in FIG. 2. While the final translation is stored in the leaf level, the upper levels of the tree are looked up by the NA PTW logic 306 to reach the correct leaf node. Similar to the leaf level, several entries of the upper levels of a page table are packed in a single cache line. In x86-64, the size of each entry in the upper level of the page table is 8-bytes long.

Thus, eight such upper-level page table entries are stored in a single 64-byte cache line. Consequently, while accessing the upper levels of a page table, the eight entries that form a neighborhood are brought together by the NA PTW logic 306. The NA IOMMU 304 leverages this to reduce memory accesses to the upper-levels of the page table as well.

Further, in some variations, page tables are not four levels. Thus, the NA PTW selectively or opportunistically coalesces accesses for any suitable page table (e.g., a 5-level page table and/or a 2-level page table), and are also contemplated in accordance with the embodiments of this disclosure. The components and functionalities of the NA IOMMU 304 will be described in FIG. 4.

Figure 4:
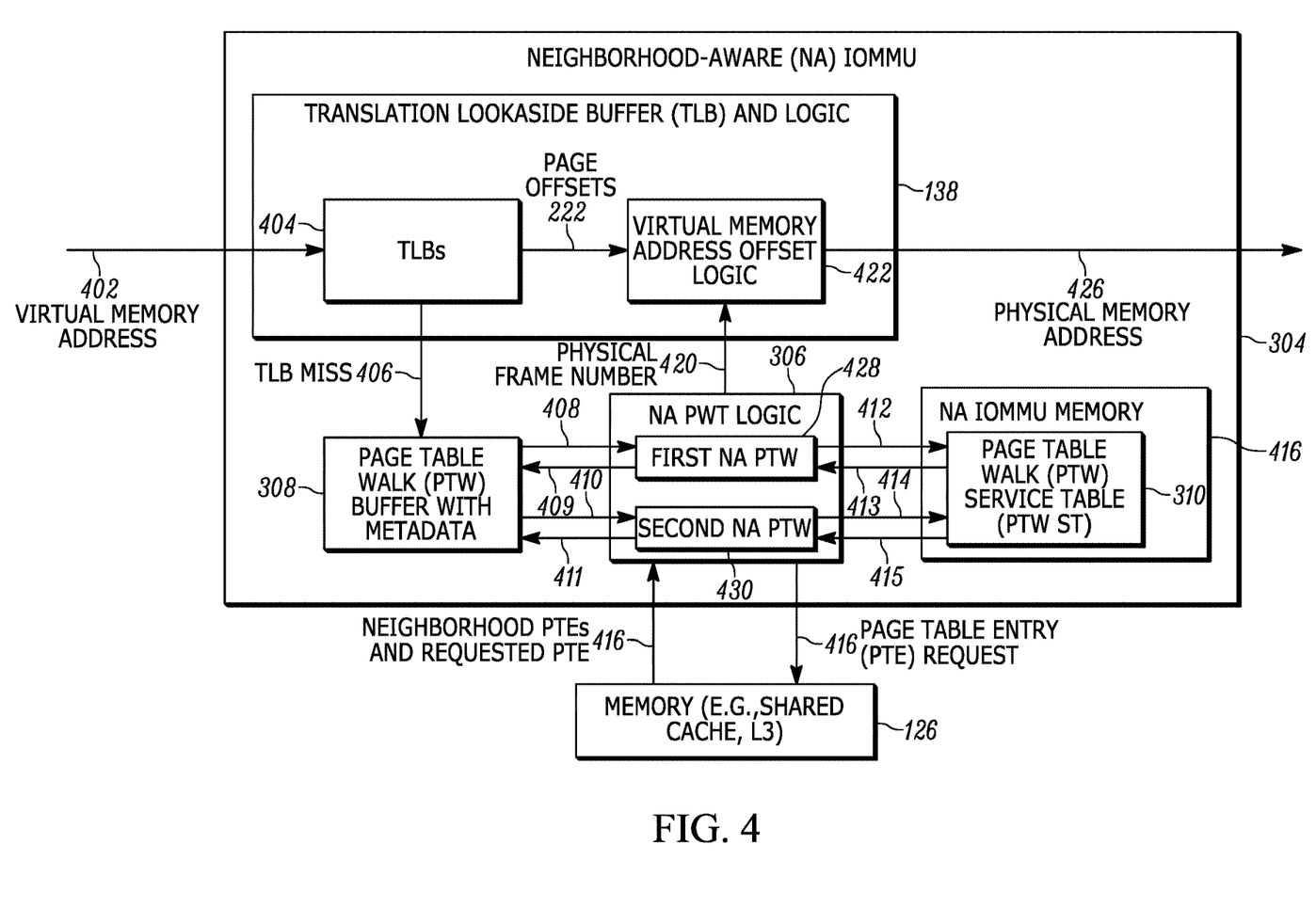
FIG. 4 is a schematic block diagram illustrating an example of a neighborhood-aware input output memory management unit (NA IOMMU) for performing neighborhood aware virtual to physical address translations in accordance with one embodiment set forth in the disclosure.

FIG. 4 shows a more detailed schematic block diagram of the NA IOMMU 304. The NA IOMMU 304 opportunistically (e.g., selectively) coalesces memory accesses to the page table for page walk requests that fall in the same neighborhood (e.g., adjacent and/or substantially adjacent) in the virtual address space. For example, the NA IOMMU 304 obtains pending requests for the virtual memory addresses 402. As explained above, the GPU 102 (e.g., the CUs 104) provides address translation requests for the virtual memory addresses that miss in the GPU's TLBs 106 and 118. The NA IOMMU 304 first looks up or scans the virtual memory address in the NA IOMMU TLBs 404.

If the virtual address is not in the TLBs 404, then the PTW BM 308 obtains TLB misses 406 from the TLBs 404. The TLB misses 406 include bits from the virtual memory addresses 402 provided by the GPU 102. In some variations, such as in the x86-64 architecture explained in FIG. 2, the TLB misses 406 are the 36 bits of the virtual memory address indicating the L4, L3, L2, L1 indexes. In other variations, the TLB misses 406 include the page offsets 222. Further, in some examples, the virtual memory addresses 402 and/or the TLB misses 406 include more or less than 36 bits. For example, if the page table includes more or less than 4 levels (e.g., a 5 level page table), then the virtual memory addresses 402 and/or the TLB misses 406 also includes additional or less bits representing the levels of the page table. Further, in some instances, the indexes for the levels of the page table are represented by more or less than 9 bits each, which causes the virtual memory addresses 402 and/or the TLB misses 406 to be more or less than 36 bits.

NA PTW logic 306 includes one or more NA PTWs (e.g., first NA PTW (NA PTW 0) 428 and second NA PTW (NA PTW 1) 430). Two NA PTWs are shown for the sake of clarity, but in other variations, the NA PTW logic 306 can include as many NA PTWs as necessary to perform neighborhood-aware address translations. The NA PTWs 428 and/or 430 obtain (e.g., retrieve and/or read) information 408, 410 from the PTW BM 308 and/or provide (e.g., store and/or write) information 409, 411 to the PTW BM 308. The NA PTWs 428 and/or 430 also obtain information 413, 415 and/or provide information 412, 414 to the NA IOMMU memory 416, such as the PTW ST 310. In some examples, the PTW BM 308 is also included in the NA IOMMU memory 416; however, any suitable combination is contemplated.

The NA PTWs 428 and/or 430 also perform neighborhood-aware page table walks by accessing memory 126. Memory 126 is a shared CPU cache, such as an L3 cache. However, in some examples, the NA PTWs 428 and/or 430 perform page table walks by accessing other memory, such as system memory 130 and/or other cache memory (e.g., L1 and/or L2 cache memory), that store the page tables. If the completed memory access was to a leaf level (L1) for a corresponding virtual memory address, then the entire walk has completed, and the NA PTWs 428 and/or 430 provide the translated physical page frame number 420 to the TLB and logic 138 (e.g., the virtual memory address offset logic 422). The virtual memory address offset logic 422 obtains the page offsets 222 and concatenates (e.g., combines) them with the physical frame number 420 to determine the physical memory addresses 426. The virtual memory address offset logic 422 provides the physical memory addresses 426 back to the GPU 102.

Figure 5:
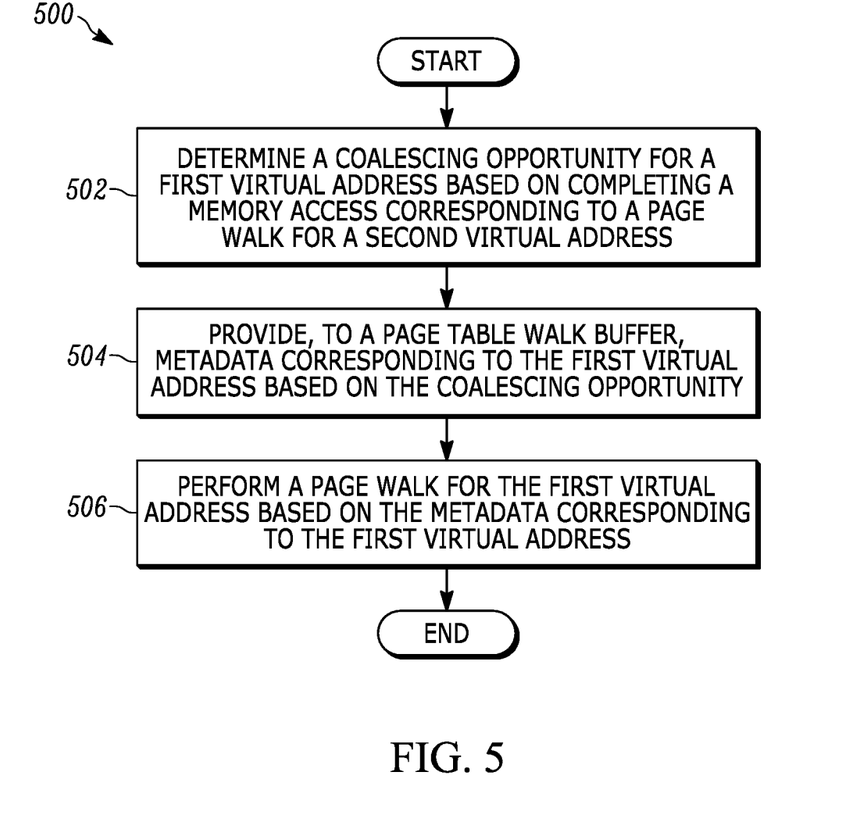
FIG. 5 is a flowchart illustrating a method for performing neighborhood aware virtual to physical address translations in accordance with one embodiment set forth in the disclosure.

FIG. 5 shows an example flowchart for performing neighborhood-aware virtual to physical address translations, as explained with reference to FIG. 4. However, any suitable structure can be employed. For example, in some variations, method 500 is implemented using more than the two NA PTWs.

In operation, at step 502, the NA PTW logic 306 determines a coalescing opportunity for a first virtual address based on completing a memory access corresponding to a page walk for a second virtual address. For example, an NA PTW (e.g., first NA PTW 428) is performing a virtual to physical translation (e.g., a page walk) for a virtual memory request (e.g., the second virtual address). By performing the page walk, the first NA PTW 428 performs one or more memory accesses to an in-memory (e.g., cache or device memory) page table. After performing the memory access, the first NA PTW 428 returns the neighborhood PTEs and the requested PTE. Whenever the first NA PTW 428 completes a memory access, the first NA PTW 428 looks up (e.g., scans, compares, and/or determines) a corresponding entry (e.g., the entry corresponding to the first NA PTW 428) in the PW ST 310 to determine the virtual page address of the current walk and the page table level that was accessed. Based on the scan, the first NA PTW 428 determines whether the page walk has been completed (e.g., if the corresponding PL field indicates a leaf-level or L1 level). If so, the first NA PTW 428 provides the requested PTE (e.g., the physical frame number 420) to the virtual memory address offset logic 422. If not, the NA PTW logic 306 performs another memory access.

Additionally, and/or alternatively, regardless of whether the first NA PTW 428 performs another memory access, the first NA PTW 428 scans the PTW BM 308 for any pending page walk request whose virtual page address falls in the same neighborhood of the just-completed walk. In other words, the first NA PTW 428 compares the pending translation requests (e.g., the virtual addresses) in the PTW BM 308 to determine whether any of the pending requests are in the same neighborhood as the completed request. If the first NA PTW 428 identifies a pending page walk request in the PTW BM 308 whose virtual page address falls in the same neighborhood of the second virtual address, then the first NA PTW 428 determines a coalescing opportunity for the identified pending page walk request (e.g., a first virtual memory address).

In other words, the first NA PTW 428 obtains a cache line 418 including the requested PTE for the second virtual address and multiple neighborhood PTEs. The neighborhood PTEs are PTEs for neighborhood or adjacent virtual address to the second virtual address. For instance, in an example when a cache line is 64-bytes and each PTE is 8-bytes, the first NA PTW 428 returns the requested PTE for the second virtual address and 7 neighborhood PTEs. For example, if the first NA PTW 428 requests a PTE for virtual address 0F5, then the first NA PTW 428 obtains a cache line 418 that includes PTEs for 0F0-0F7. The first NA PTW 428 scans the PTW BM 308 to determine any virtual page addresses falling within the same neighborhood (e.g., 0F0-

0F7) as the second virtual address. If there is an adjacent virtual address (e.g., the first virtual address) within the same neighborhood, then the NA PTW logic 306 determines a coalescing opportunity for the virtual address.

In some examples, after completing a memory access for the leaf level or L1 level for a virtual memory address (e.g., second virtual memory address), if the first NA PTW 428 determines a coalescing opportunity for a virtual memory address (e.g., first virtual memory address) in the PTW BM 308, then the first NA PTW 428 provides the physical frame number 420 to the virtual memory address offset logic 422. In other words, another NA PTW does not need to process the pending virtual memory address in the PTW BM 308, and by the NA PTW performing a memory access for the second virtual address, the NA PTW logic 306 completes a virtual to physical address translation for the first virtual address.

In some instances, if the just-completed memory access for the second virtual memory address was to the L2, L3 or L4 level (upper-level) of the page table, then the cache line includes 32 KB, 16 MB, 8 GB or 4 TB aligned virtual memory regions, respectively. The NA PTW logic 306 determines a coalescing opportunity based on scanning the PTW BM 308 for any page walk request in the same neighborhood of the just-completed page table access. For any such matching request, the physical page frame number for the next level of the page table is available in the 64-byte cache line brought by the walker.

At step 504, the NA PTW logic 306 (e.g., the first NA PTW 428) provides, to the page table walk buffer (e.g., the PTW BM 308), metadata 312 corresponding to the first virtual address based on the coalescing opportunity. For example, the first NA PTW 428 provides an updated PA field, PL field, and/or CL field to the PTW BM 308. In some examples, the first NA PTW 428 updates the PA field in the corresponding entry in the PTW BM 308 with an address (e.g., PTE) from the cache line 418. In some variations, the first NA PTW 428 updates the PL field to include the corresponding level of the page table. Values of these fields (PL and PA) are used to complete walk requests whose accesses to upper-levels of the page table are coalesced (e.g., a partially coalesced walk). Additionally, and/or alternatively, in other variations, the first NA PTW 428 updates the coalescing field of the metadata 312. The coalescing field indicates that an NA PTW (e.g., the first NA PTW 428) is performing an on-going page table access and is also being used to service the pending page walk request entirely or partially.

For example, based on the coalescing opportunity (e.g., determining that a first virtual address is able to be opportunistically coalesced based on a completed memory access for a second virtual address), the first NA PTW 428 updates the metadata 312 corresponding to the first virtual address. In the example that the first NA PTW 428 obtains a cache line 418 that includes PTEs for 0F0-0F7 and the first virtual address includes in part the virtual memory address 0F4, then the first NA PTW 428 determines a coalescing opportunity for a first virtual memory address. The first NA PTW 428 updates the metadata 312 in the PTW BM 308 for the first virtual address. For example, the first NA PTW 428 updates the coalescing field to 1 indicating that the virtual address is being coalesced with another page table walk. Additionally, and/or alternatively, the first NA PTW 428 updates the PA field with a physical address or PTE corresponding to the virtual address 0F4 (e.g., 11). Further, the first NA PTW 428 updates the PL field with the page level accessed (e.g., L4, L3, L2, or L1) corresponding to the completed memory access for the second virtual memory address. If the first NA PTW 428 completes a memory access for the L4 level, then the first NA PTW 428 updates the PL field with L4.

Additionally, and/or alternatively, the NA PTW logic 306 retrieves all valid PTW ST 310 entries. The NA PTW logic 306 determines the neighborhood of each on-going page table access in the PTW ST 310 using their respective virtual page address and the level of the page table being accessed. The NA PTW logic 306 scans or compares these entries to the pending walk requests in the PTW BM 308. If an entry in the PTW BM 308 has a virtual page address that falls within any of the determined neighborhoods, the NA PTW logic 306 updates (e.g., sets) the CL field of the corresponding entry, and thus the corresponding entry will not be serviced by a free NA PTW.

In some variations, the NA PTW logic 306 and/or other logic creates and/or generates metadata 312 for the virtual memory addresses (e.g., pending walk requests). For example, the NA PTW logic 306 and/or other logic generates NULL values for the PA field, PL field, and/or CL field for a pending walk request. The NA PTW logic 306 and/or other logic provides (e.g., stores) the NULL values with the corresponding entries in the PTW BM 308. Then, based on the coalescing opportunity, the NA PTW logic 306 updates the NULL values in the metadata 312 with other values as described above.

At step 506, the NA PTW logic 306 performs a page walk for the first virtual address based on the metadata 312 corresponding to the first virtual address. For example, a free NA PTW (e.g., the second NA PTW 430) selects which of the pending page walk requests in the PTW BM 308 is to be serviced next. Typically, a traditional IOMMU, such as the IOMMU 132, selects requests in first-come-first-serve order from its buffer 136. However, the second NA PTW 430 modifies this to avoid servicing a walk request that is being coalesced with an on-going page table access by another page table walker (e.g., the second NA PTW 430). For example, the second NA PTW 430 selects a page walk request based on the corresponding entry's coalescing field. If the coalescing field is a bit or flag that is set to 1, then the second NA PTW 430 skips or ignores the pending page walk request. However, if CL field of the corresponding entry is not set (e.g., 0) and not immediately considered to be serviced by another page table walker, then the second NA PTW 430 selects the pending request from the PTW BM 308. In some examples, the second NA PTW 430 selects the request on a first-come-first-serve basis as long as the coalescing field is not set and immediately considered by another page table walker.

After selecting a request (e.g., the first virtual memory address), the second NA PTW 430 then starts by looking up the PA and PL fields in the PTW BM 308 of the corresponding request. If both these fields are unset (NULL), then the second NA PTW 430 begins the page walk starting from the root of the page table. Otherwise, if these fields are set, then the walk request is partially coalesced with previous walks. The second NA PTW 430 then needs to finish the walk by starting from the level indicated in the PL field of the metadata 312. The second NA PTW 430 accesses the physical address in the PA field. Additionally, and/or alternatively, the second NA PTW 430 populates the corresponding PW ST 310 entry with the information of the walk request (e.g., PL and virtual address). Further, the second NA PTW 430 deletes the entry in the PTW BM 308.

The NA PTWs 428 and/or 430 are described above with logic that performs neighborhood aware virtual to physical address translation. However, in some examples, the logic for performing neighborhood aware virtual to physical address translation is separate from the PTWs that access memory. For example, traditional PTWs, such as PTWs 134, access memory and obtain cache lines with the requested PTE and neighborhood PTEs. Thus, in such examples, the NA PTW logic 306 includes traditional PTWs 134 and separate logic that is configured to performing neighborhood aware virtual to physical address translations. For example, after obtaining the neighborhood PTEs, the separate logic updates the metadata in the PTW BM 308 and/or updates the PTW ST 310 as explained above. Additionally, and/or alternatively, as explained above, the separate logic determines, based on the CL field, whether a traditional PTW 134 begins a page walk for a pending request in the PTW BM 308.

Figure 6:
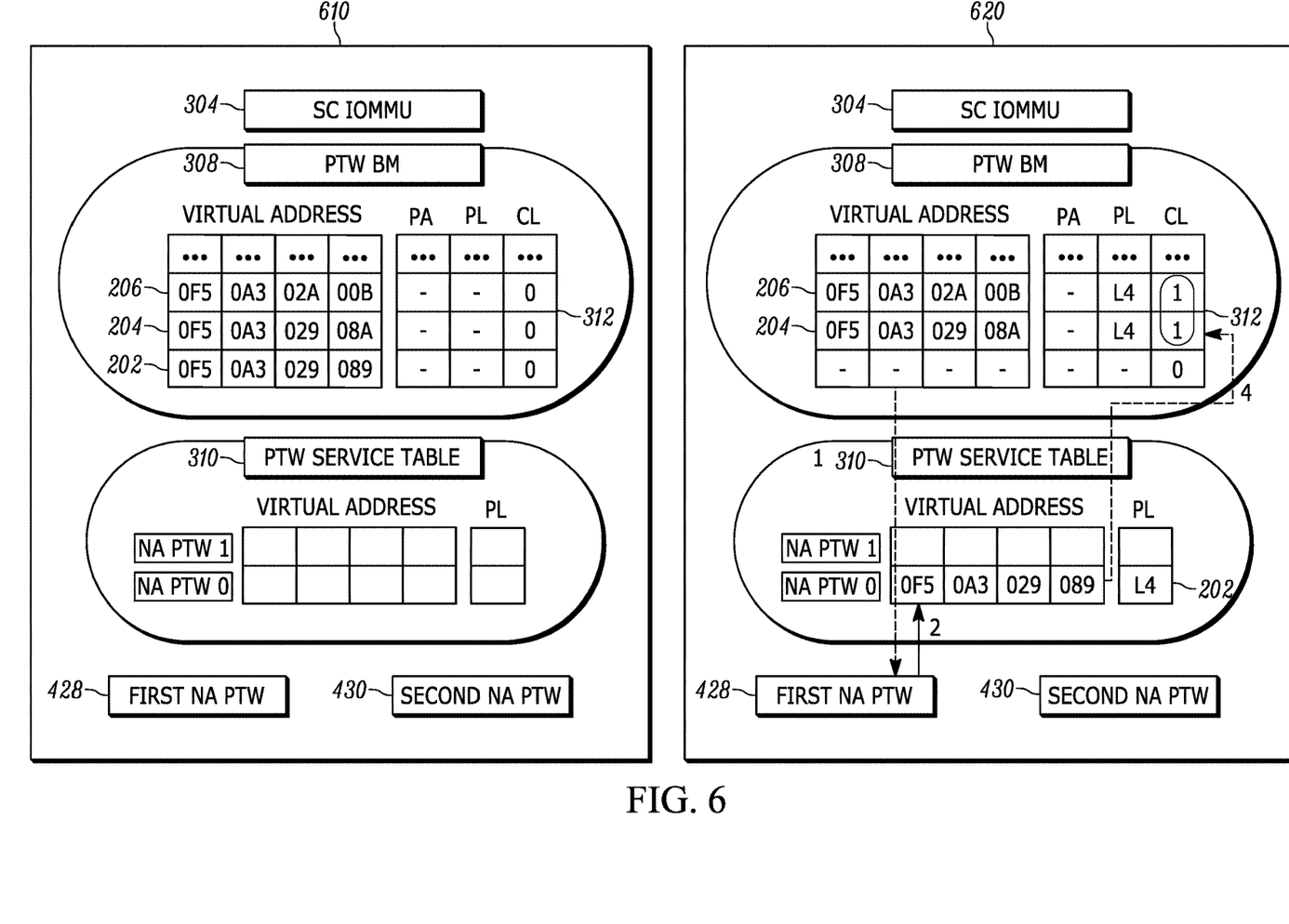
FIG. 6 is an exemplary representation of a page table walk buffer with metadata (PTW BM) and a page table walker service table (PTW ST) in accordance with one embodiment set forth in the disclosure.
Figure 7:
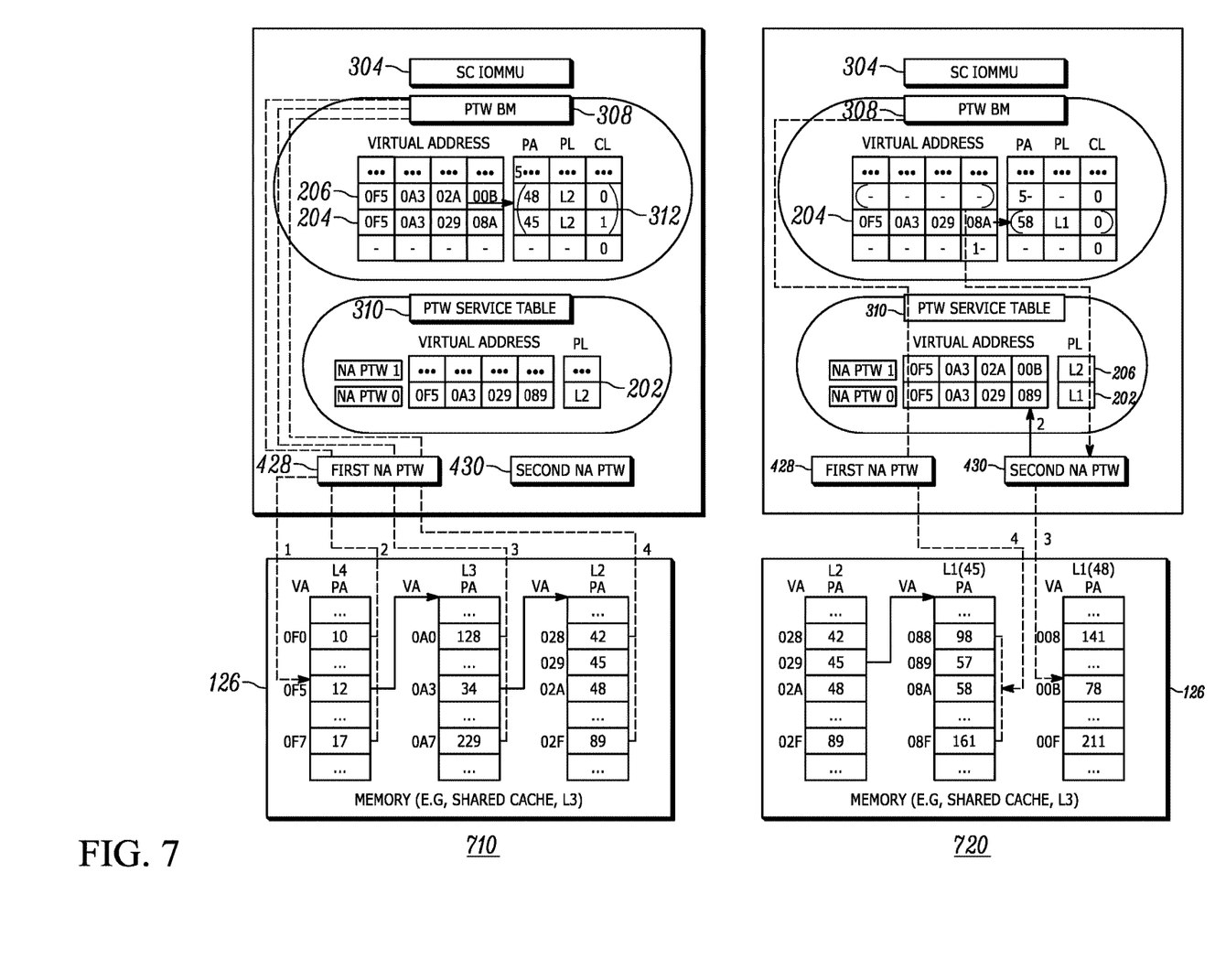
FIG. 7 is another exemplary representation of a page table walk buffer with metadata (PTW BM) and a page table walker service table (PTW ST) in accordance with one embodiment set forth in the disclosure.

FIGS. 6 and 7 show a running example of how NA PTWs 428 and 430 perform virtual to physical translations based on neighborhood PTEs. For example, FIGS. 6 and 7 show an example operation of method 500, including updates (e.g., reads and/or writes) to the PTW BM 308 and/or the PTW ST 310. State 610 shows an initial state with three page walk requests (e.g., virtual addresses) waiting to be serviced in the PTW BM 308. These addresses are the same three virtual addresses 202, 204, 206 described in FIG. 2. However, while FIG. 2 depicts how different page walks often access entries in the same cache line (i.e., neighborhood) and discards these entries, the NA PTWs 428 and 430 use the neighborhood PTEs from the same cache line to coalesce page table accesses in PTW BM 308. Initially, the three virtual addresses 202, 204, 206 has corresponding NULL metadata 312.

State 620 shows that the page walk request for the first virtual memory address 202 (virtual address 0x0F5|0x0A3|0x029|0x089) is serviced by the first NA PTW 428 (e.g., PTW 0). For example, the first NA PTW 428 retrieves and/or deletes the virtual address 202 from the PTW BM 308 and stores (e.g., writes) the virtual address 202 into the PTW service table 310. Additionally, and/or alternatively, the first NA PTW 428 scans the PTW service table 310 and determines a coalescing opportunity (e.g., the pending walk requests for virtual addresses 204 and 206 are able to be coalesced with the walk for virtual address 202). The first NA PTW 428 updates the metadata 312 by setting the coalescing field to 1 for the virtual addresses 204 and 206).

Further, although the second NA PTW 430 (e.g., NA PTW 1) is free, the second NA PTW does not start a page walk for the pending requests 204 and 206. For example, as mentioned previously, the NA PTWs check the coalescing field for each of the pending requests. If the coalescing field for the request is set (e.g., 1), then free NA PTWs do not begin page walks because the NA PTWs determines a coalescing opportunity for these pending requests.

Referring to FIG. 7, state 710 shows the status of the IOMMU when the first NA PTW 428 finishes page table accesses (e.g., memory accesses) up to the level L2. For example, the first NA PTW 428 begins the page walk for the virtual memory address 202 at the root node (e.g., L4 level). The first NA PTW 428 retrieves a cache line 418 including eight PTEs (e.g., the requested PTE for 0F5 and neighborhood PTEs associated with the virtual addresses 0F0-0F4, 0F6, and 0F7). Based on comparing the cache line 418 with the pending requests for virtual addresses 204 and 206 in the PTW BM 308, the first NA PTW 428 updates the metadata 312 (e.g., the PA, PL, and CL field). For example, for the virtual address 204 and 206, the first NA PTW 428 updates the PA field to 12 (e.g., the PTE from 0F5), the PL field to L4, and the CL field to 1. Then, the first NA PTW 428 performs another memory access (e.g., a L3 level memory access) for the virtual memory address 202. The first NA PTW 428 obtains another cache line 418 with neighborhood PTEs, and updates the metadata accordingly (e.g., PA field is 34, PL field is L3, and CL field is 1 for virtual addresses 204 and 206).

After, the first NA PTW 428 performs another memory access (e.g., a L2 level memory access) for the virtual memory address 202. For example, the first NA PTW 428 obtains a cache line 418 for PTEs corresponding to the virtual addresses 028-02F. The metadata 312 is updated to include the physical page address of the corresponding L1 nodes (e.g., 45 and/or 48). For instance, similar to above, the first NA PTW 428 updates the PA, PL, and CL fields for pending request 204 with 45, L2, and 1 respectfully. However, rather than discarding the neighborhood PTEs from the cache line 418, the first NA PTW 428 uses the neighborhood PTEs to update the metadata 312 for virtual address 206. For example, based on the neighborhood PTEs, the first NA PTW 428 updates the PA field to 48 and the PL field to L2. Further, the first NA PTW 428 determines that the coalescing opportunity for page walking between the virtual address 202 and 206 has ended, and updates the CL field to unset (e.g., 0 or NULL). Unsetting the CL field makes the pending request (e.g., virtual address 206) eligible to be serviced by another NA PTW (e.g., the second NA PTW 430). However, the CL field for the request for the virtual address 204 remains set, and the page walk for this request is coalesced with until the leaf node.

State 720 shows the state after the first NA PTW 428 finishes the memory access to the L1 (leaf) level of the page table. At this point, the address translation for the virtual memory address 202 is complete. Additionally, based on the returned cache line including the neighborhood PTEs (e.g., PTEs for virtual addresses 088-08F), the first NA PTW 428 also completes the address translation for the virtual address 204. In other words, the first NA PTW 428 updates the PA field with 58 and the PL field with L1. Based on the new PA field and/or PL field (e.g., the PL field being L1), the first NA PTW 428 determines that the address translation for the virtual address 204 is completely coalesced and no access to the in-memory page table is performed and/or necessary. The first NA PTW 428 provides the physical frame number 420 (e.g., 58 for virtual address 204 and/or 57 for virtual address 202) to the virtual memory address offset logic 422. Then, the virtual memory address offset logic 422 concatenates this with the page offsets 222 and returns the physical memory address 426 to the GPU 102.

For the virtual memory address 204, the first NA PTW 428 is able to coalesce the virtual memory address 204 until the L2 level. Another NA PTW, such as the second NA PTW 430, finishes the page walk for the virtual memory address 204. Based on the metadata 312 corresponding to the virtual memory address 204, the second NA PTW 430 does not start the page walk at the root node, and instead starts the page walk at the level indicated by the PL field. For example, since the PL field for virtual address 204 is L2, the second NA PTW 430 begins the page walk at the leaf node (e.g., L1 level). For instance, the second NA PTW 430 accesses the in-memory page table based on the PA field (e.g., "48") and obtains a cache line 418 with the requested PTE and neighborhood PTEs for virtual addresses 008-00F. Based on the memory access to the L2 level, the second NA PTW 430 completes the address translation, and provides the physical frame number 420 for the virtual address 204 (e.g., "78") to the virtual memory address offset logic 422.

Figure 8:
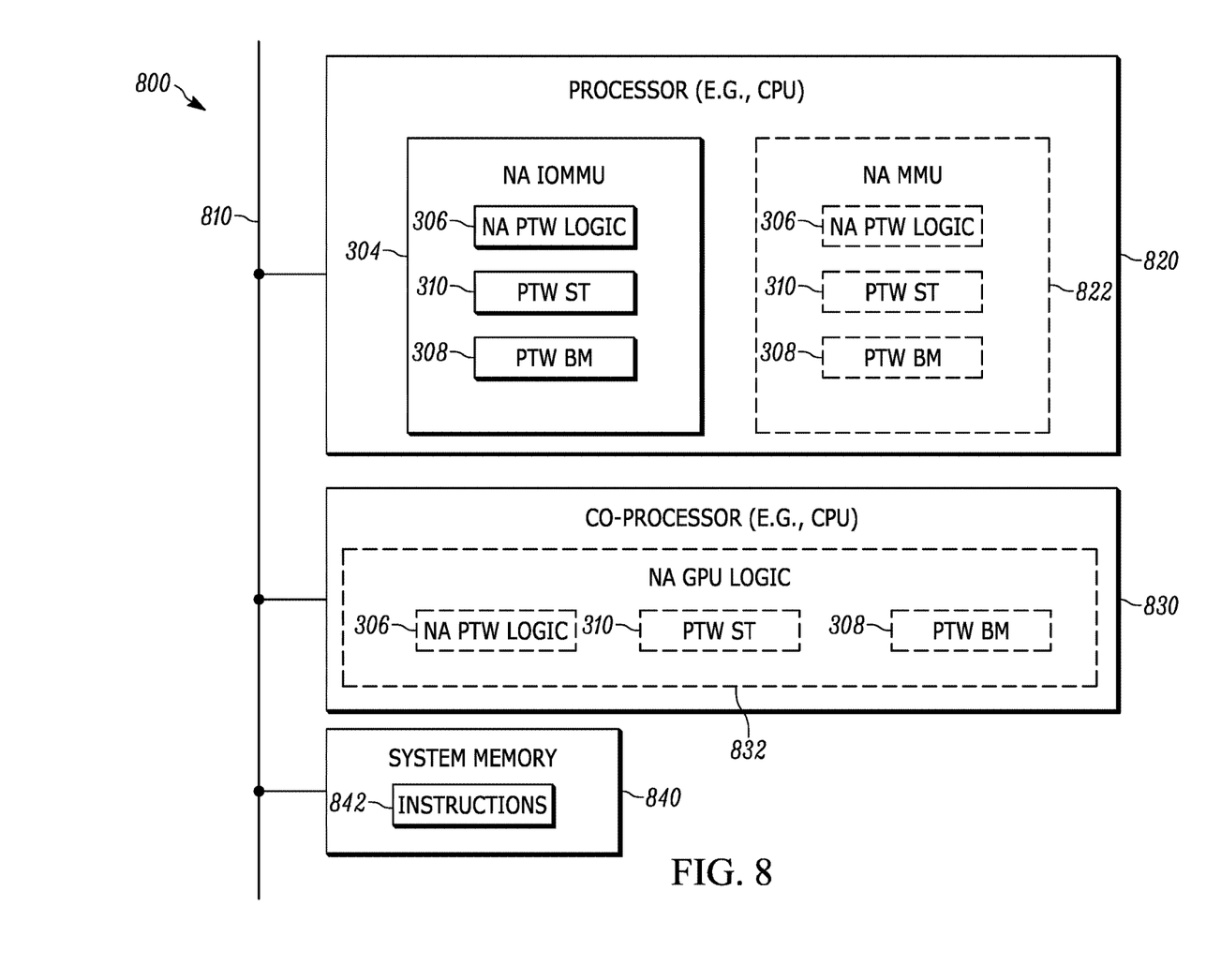
FIG. 8 is a schematic block diagram illustrating another example of a neighborhood-aware (NA) apparatus for performing neighborhood aware virtual to physical address translations in accordance with one embodiment set forth in the disclosure.

FIG. 8 is a schematic block diagram illustrating another example of an apparatus 800 for performing neighborhood-aware virtual to physical address translations, such as method 500 and/or other methods in this disclosure.

The apparatus 800 includes a bus 810 that, directly and/or indirectly, couples the following devices: a processor 820 (e.g., CPU), a co-processor 830 (e.g., GPU), and system memory 840. Any number of additional components, different components, and/or combinations of components are also included in the apparatus 800. For example, ethernet port(s), wireless communications unit(s), and/or input/out device(s) may also be included in the apparatus 800.

The bus 810 represents one or more busses (such as, for example, an address bus, data bus, cache line, or combination thereof). Similarly, in some implementations, the apparatus 800 includes a number of processors 820 and co-processors 830, and/or a number of memory components 840. Additionally, any number of these components, or combinations thereof, is distributed and/or duplicated across a number of computing devices and/or apparatuses.

In one example, the processor 820 (e.g., CPU) includes an NA IOMMU 304. The NA IOMMU 304 includes NA PTW logic 306, PTW ST 310, PTW BM 308. In some instances, the NA IOMMU 304 includes TLBs and logic (not displayed), which is described above. The functionalities of the NA IOMMU 304 and the components of the NA IOMMU 304 are described above. Additionally, and/or alternatively, in some examples, the processor 820 includes neighborhood-aware memory management unit (NA MMU) 822. For example, the NA MMU 822 is included in one or more processor cores, such as core 0 122 and/or core 1 124 shown in FIG. 3. The NA MMU 822 includes the NA PTW logic 306, the PTW ST 310, and/or the PTW BM 308. The NA MMU 822 and/or the components of the NA MMU 822 are configured to perform neighborhood-aware virtual to physical address translations as described above.

In some variations, the co-processor 830 (e.g., GPU) includes NA GPU logic 832. The NA GPU logic 832 includes the NA PTW logic 306, the PTW ST 310, and/or the PTW BM 308. For example, instead of the GPU 830 providing the address translations to the NA IOMMU 304 as described above, the GPU 830 includes NA GPU logic 832 that is configured to perform neighborhood-aware virtual to physical address translations. In other words, in such variations where the NA GPU logic 832 is included in the GPU 830, after a miss in the GPU's TLBs, the GPU 830 does not need to provide the translation request to the CPU 820 and/or the NA IOMMU 304. Instead, the NA GPU logic 832 obtains the translation request, and performs the neighborhood-aware virtual to physical address translations as described above.

In some instances, a single processor (e.g., an accelerated processing unit (APU)) includes the processor 820 (e.g., CPU), the co-processor 830 (e.g., GPU), and/or the functionalities and/or components of the processor 820 and the co-processor 830. In other words, the APU includes the NA PTW logic 306, the PTW ST 310, and/or the PTW BM 308. Additionally, and/or alternatively, the APU is configured to perform neighborhood-aware virtual to physical address translations.

In one example, the memory 840 stores computer-executable instructions 842 that when executed cause the processor 820 and co-processor 830 to implement aspects of embodiments of apparatus components discussed herein and/or to perform aspects of embodiments of methods and procedures discussed herein. The memory 840 is system memory, and includes RAM, ROM, or any suitable memory.

The illustrative apparatus 800 shown in FIG. 8 is not intended to suggest any limitation as to the scope of use or functionality of embodiments of the present disclosure. Neither should the illustrative apparatus 800 be interpreted as having any dependency or requirement related to any single component or combination of components illustrated therein.

Also, integrated circuit fabrication systems (e.g., wafer fabrication system) are known that create wafers with integrated circuits based on executable instructions stored on a computer readable medium such as but not limited to CDROM, RAM, other forms of ROM, hard drives, distributed memory, etc. are produced by an integrated circuit design system (e.g., work station). The instructions are represented by any suitable language such as but not limited to hardware descriptor language (HDL), Verilog or other suitable language. As such, the logic and circuits described herein may also be produced as integrated circuits by such fabrication systems using the non-transitory computer readable medium with instructions stored therein. For example, an integrated circuit with the logic and structure described above is created using such integrated circuit fabrication systems. The computer readable medium stores instructions executable by one or more integrated circuit design systems that causes the one or more integrated circuit design systems to fabricate an integrated circuit. For example, the designed integrated circuit includes the NA PTW logic 306, the PTW BM 308, and/or the PTW ST 310. Further, in some implementations, the integrated circuit determines a coalescing opportunity for a first virtual address based on completing a memory access corresponding to a page walk for a second virtual address. The integrated circuit provides, to a page table walk buffer, metadata corresponding to the first virtual address based on the coalescing opportunity. The integrated circuit performs a page walk for the first virtual address based on the metadata corresponding to the first virtual address. In some implementations, the fabricated integrated circuit also includes other aspects described herein.

Among other technical benefits, some implementations of the methods and apparatus described above allow for more efficient virtual to physical address translations. For example, when tested with a system with an NA CPU and GPU over a variety of applications, full neighborhood-aware coalescing of page walk requests (e.g., coalescing of the upper levels and the leaf level) speeds up irregular applications by around 1.7 times, on average. One irregular application (a scalar, vector, and matrix multiplication application) sped up by 2.3 times using the neighborhood-aware page table walkers. Other irregular applications, such as applications for a matrix vector product and transpose, a matrix transpose and vector multiplication, an optimization algorithm for DNA sequence alignments, and a sub kernel of a biconjugate gradient stabilized method linear solver, also sped up considerably when using the neighborhood-aware page table walkers. Further, performing neighborhood-aware coalescing of accesses to the page table reduces the number of memory accesses performed by the NA PTWs. Coalescing can significantly reduce the number of access to the in-memory page table—on average, full coalescing leads to about 37% reduction in page table access.

Additionally, and/or alternatively, compared to PWCs, the method and apparatus described above reduces queuing delay in the PTW BM 308 by involving fewer NAs PTWs to perform a given number of walks, something that the PWCs based design cannot achieve. For instance, in some examples, a single NA PTW partially coalesces page table walks (e.g., performs memory accesses) for two or more virtual addresses in the PTW BM 308. Furthermore, in other examples, the single NA PTW also fully coalesces page table walks such that no memory access is necessary for some virtual addresses.

The above detailed description of the present disclosure and the examples described therein have been presented for the purposes of illustration and description only and not by limitation. It is therefore contemplated that the present disclosure covers any and all modifications, variations or equivalents that fall within the scope of the basic underlying principles disclosed above and claimed herein.

What is claimed is:

1. A method, carried out by an apparatus, for providing virtual to physical memory address translations, the method comprising:
    determining a coalescing opportunity for a first virtual address based on completing a memory access corresponding to a page walk for a second virtual address;
    providing, to a page table walk buffer, metadata corresponding to the first virtual address based on the coalescing opportunity; and
    performing a page walk for the first virtual address based on the metadata corresponding to the first virtual address.

2. The method of claim 1, wherein the determining the coalescing opportunity for the first virtual address comprises:
    retrieving, from memory, a plurality of page table entries comprising a page table entry for the second virtual address and a plurality of neighborhood page table entries, wherein the plurality of neighborhood page table entries are page table entries in a same cache line as the page table entry for the second virtual address; and
    determining that the plurality of neighborhood page table entries comprises a page table entry for the first virtual address.

3. The method of claim 2, wherein the providing the metadata corresponding to the first virtual address comprises providing, to the page table walk buffer, a physical address field corresponding to the first virtual address and a page level field corresponding to the first virtual address based on the page table entry for the first virtual address.

4. The method of claim 2, wherein:
    the providing the metadata corresponding to the first virtual address comprises providing, to the page table walk buffer, a coalescing logic field corresponding to the first virtual address; and
    the coalescing logic field indicates that the first virtual address is being coalesced with the page walk for the second virtual address.

5. The method of claim 1, wherein:
    the metadata corresponding to the first virtual address comprises a physical address field and a page level field; and
    the performing the page walk for the first virtual address comprises using the physical address field corresponding to the first virtual address and the page level field corresponding to the first virtual address to reduce at least one memory access for the page walk of the first virtual address.

6. The method of claim 5, wherein the performing the page walk for the first virtual address comprises:
    initiating the page walk for the first virtual address at a page level indicated by the page level field; and
    accessing a physical memory location indicated by the physical address field.

7. The method of claim 5, wherein the performing the page walk for the first virtual address comprises:
    in response to determining that a page level corresponding to the first virtual address indicates a leaf node, providing, to a requestor and without performing a memory access for the first virtual address, a physical frame number indicated by the physical address field corresponding to the first virtual address, wherein the physical frame number corresponds to a translated physical address for the first virtual address.

8. The method of claim 1, wherein:
    the metadata corresponding to the first virtual address comprises a coalescing logic field indicating that the first virtual address is being coalesced with the page walk for the second virtual address; and
    the performing the page walk for the first virtual address comprises delay performing the page walk for the first virtual address based on the coalescing logic field.

9. A processor comprising:
    a page table walk buffer; and
    neighborhood-aware page table walker logic comprising:
        a first neighborhood-aware page table walker configured to:
            determine a coalescing opportunity for a first virtual address based on completing a memory access corresponding to a page walk for a second virtual address;
            provide, to the page table walk buffer, metadata corresponding to the first virtual address based on the coalescing opportunity; and
        a second neighborhood-aware page table walker configured to:
            perform a page walk for the first virtual address based on the metadata corresponding to the first virtual address.

10. The processor of claim 9, wherein:
    the processor comprises cache memory;
    the processor is configured to store a page table in the cache memory; and
    the first neighborhood-aware page table walker is configured to determine the coalescing opportunity for the first virtual address by:
        retrieving, from the cache memory storing the page table, a plurality of page table entries comprising a page table entry for the second virtual address and a plurality of neighborhood page table entries, wherein the plurality of neighborhood page table entries are page table entries in a same cache line as the page table entry for the second virtual address; and
        determining that the plurality of neighborhood page table entries comprises a page table entry for the first virtual address.

11. The processor of claim 10, wherein the first neighborhood-aware page table walker is configured to provide the metadata corresponding to the first virtual address by:
    providing, in the page table walk buffer, a physical address field corresponding to the first virtual address and a page level field corresponding to the first virtual address based on the page table entry for the first virtual address.

12. The processor of claim 10, wherein:
    the first neighborhood-aware page table walker is configured to provide the metadata corresponding to the first virtual address by providing, in the page table walk buffer, a coalescing logic field corresponding to the first virtual address; and the coalescing logic field indicates that the first virtual address is being coalesced with the page walk for the second virtual address.

13. The processor of claim 9, wherein:

the metadata corresponding to the first virtual address comprises a physical address field and a page level field; and the second neighborhood-aware page table walker is configured to perform the page walk for the first virtual address by using the physical address field corresponding to the first virtual address and the page level field corresponding to the first virtual address to reduce at least one memory access for the page walk of the first virtual address.

14. The processor of claim 13, wherein the second neighborhood-aware page table walker is configured to perform the page walk for the first virtual address by:

initiating the page walk for the first virtual address at a page level indicated by the page level field; and accessing a physical memory location indicated by the physical address field.

15. The processor of claim 13, wherein the second neighborhood-aware page table walker is configured to perform the page walk for the first virtual address by:

in response to determining that a page level corresponding to the first virtual address indicates a leaf node, providing, to a requestor and without performing a memory access for the first virtual address, a physical frame number indicated by the physical address field corresponding to the first virtual address, wherein the physical frame number corresponds to a translated physical address for the first virtual address.

16. The processor of claim 9, wherein:

the metadata corresponding to the first virtual address comprises a coalescing logic field indicating that the first virtual address is being coalesced with the page walk for the second virtual address; and the second neighborhood-aware page table walker is configured to delay performing the page walk for the first virtual address based on the coalescing logic field.

17. The processor of claim 9, further comprising:

a page table walk service table;

wherein the first neighborhood-aware page table walker is configured to determine the coalescing opportunity for the first virtual address by:

retrieving, from the page table walk service table, an entry corresponding to the second virtual address;

determining neighborhood virtual addresses of the second virtual address based on the entry corresponding to the second virtual address, wherein the neighborhood virtual addresses are virtual addresses adjacent to the second virtual address; and determining the coalescing opportunity based on the neighborhood virtual addresses.

18. The processor of claim 9, wherein:

the processor comprises a central processing unit (CPU);

the CPU comprises a neighborhood-aware input-output memory management unit (NA IOMMU); and the NA IOMMU comprises:

the page table walk buffer with metadata; and the neighborhood-aware page table walker logic.

19. The processor of claim 18, further comprising:

a graphics processing unit (GPU), operatively coupled to the CPU, and wherein the neighborhood-aware page table walker logic is configured to obtain the first virtual address and the second virtual address from the GPU.

20. The processor of claim 9, wherein:

the processor is a graphics processing unit (GPU); and the GPU comprises:

the page table walk buffer; and the neighborhood-aware page table walker logic.

21. A processor comprising:

a page table walk buffer comprising a physical address field corresponding to a first virtual address, a page level field corresponding to the first virtual address, and a coalescing logic field corresponding to the first virtual address;

cache memory, wherein the processor is configured to store a page table in the cache memory; and neighborhood-aware page table walker logic comprising:

a first neighborhood-aware page table walker configured to:

based on performing a memory access for a page walk for a second virtual address, retrieve, from the cache memory storing the page table, a plurality of page table entries comprising a page table entry for the second virtual address and a plurality of neighborhood page table entries, wherein the plurality of neighborhood page table entries are page table entries in a same cache line as the page table entry for the second virtual address;

determine that the plurality of neighborhood page table entries comprises a page table entry for the first virtual address;

provide, to the page table walk buffer, the physical address field corresponding to the first virtual address and the page level field corresponding to the first virtual address based on the page table entry for the first virtual address; and a second neighborhood-aware page table walker configured to:

perform a page walk for the first virtual address using the physical address field corresponding to the first virtual address and the page level field corresponding to the first virtual address to reduce at least one memory access for the page walk of the first virtual address.

22. The processor of claim 21, wherein the second neighborhood-aware page table walker is configured to perform the page walk for the first virtual address by:

initiating the page walk for the first virtual address at a page level indicated by the page level field; and accessing a physical memory location indicated by the physical address field.

23. The processor of claim 21, wherein the second neighborhood-aware page table walker is configured to perform the page walk for the first virtual address by:

in response to determining that a page level corresponding to the first virtual address indicates a leaf node, providing, to a requestor and without performing a memory access for the first virtual address, a physical frame number indicated by the physical address field corresponding to the first virtual address, wherein the physical frame number corresponds to a translated physical address for the first virtual address.

24. The processor of claim 21, wherein the first neighborhood-aware page table walker is configured to:

provide, to the page table walk buffer, the coalescing logic field corresponding to the first virtual address, wherein the coalescing logic field indicates that the first virtual address is being coalesced with the page walk for the second virtual address.

25. The processor of claim 24, wherein the second neighborhood-aware page table walker is configured to delay performing the page walk for the first virtual address based on the coalescing logic field.

26. The processor of claim 21, wherein:
the processor comprises a central processing unit (CPU);
the CPU comprises a neighborhood-aware input-output memory management unit (NA IOMMU); and
the NA IOMMU comprises:
   the page table walk buffer; and
   the neighborhood-aware page table walker logic.

27. The processor of claim 26, further comprising:
a graphics processing unit (GPU), operatively coupled to the CPU, and
wherein the neighborhood-aware page table walker logic is configured to obtain the first virtual address and the second virtual address from the GPU.

28. The processor of claim 21, wherein:
the processor is a graphics processing unit (GPU); and
the GPU comprises:
   the page table walk buffer; and
   the neighborhood-aware page table walker logic.

* * * * *